Nov. 25, 1958     H. B. YOUNG     2,861,851
PISTON AND ROD ASSEMBLIES
Filed Jan. 30, 1956
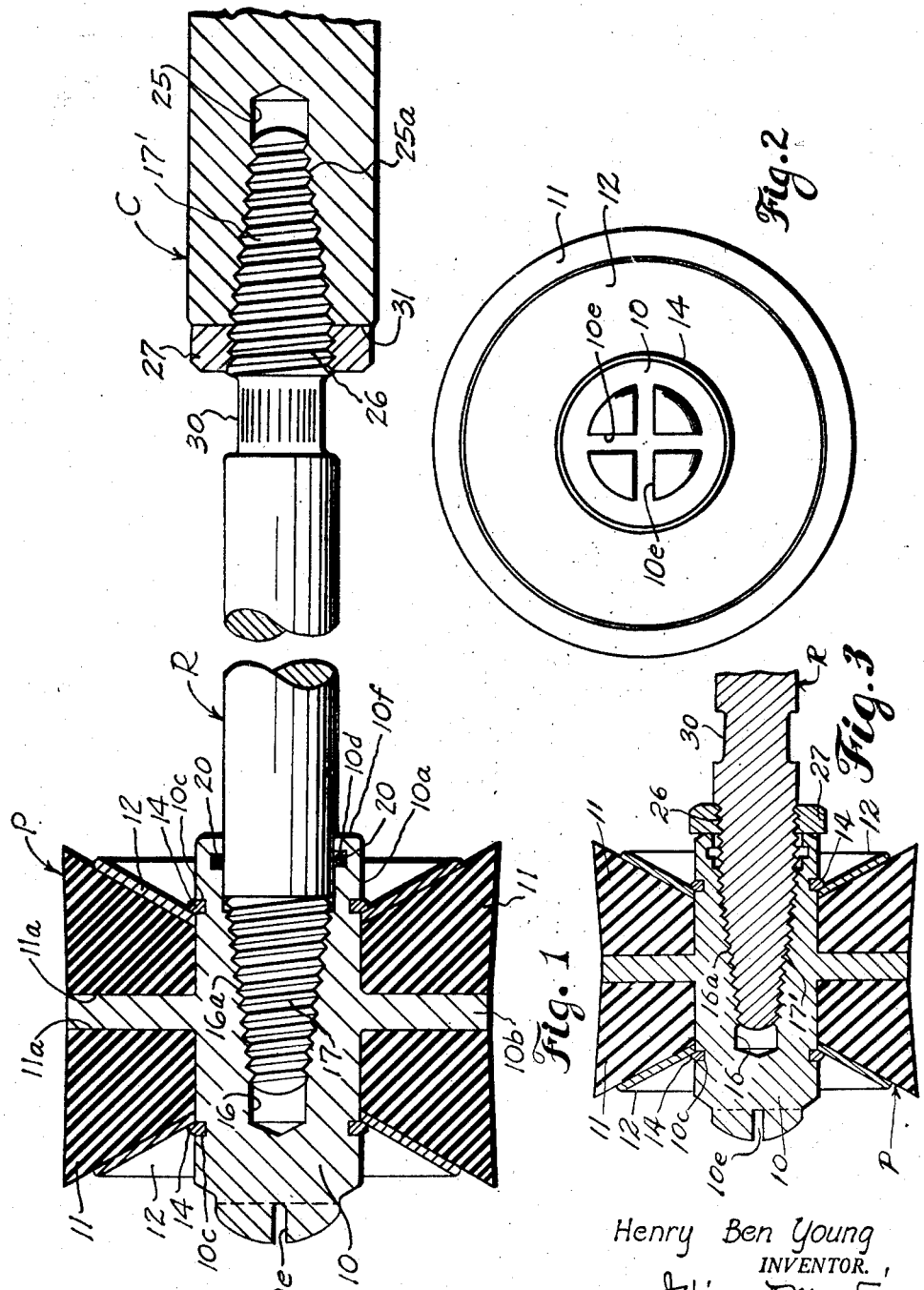
Henry Ben Young
INVENTOR.

United States Patent Office 2,861,851
Patented Nov. 25, 1958

2,861,851

PISTON AND ROD ASSEMBLIES

Henry Ben Young, Houston, Tex., assignor to Mission Manufacturing Company, Houston, Tex., a corporation of Texas Application January 30, 1956, Serial No. 562,157

7 Claims. (Cl. 309—17)

This invention relates to new and useful improvements in piston and rod assemblies.

An object of this invention is to provide a new and improved piston and rod assembly wherein a new and improved connecting means between the piston and the piston rod is provided.

An important object of this invention is to provide a new and improved piston and rod assembly wherein a tapered thread connection is effected between the piston and the piston rod which has sufficient frictional tightness to normally prevent an inadvertent release of the piston from the piston rod.

Another object of this invention is to provide a new and improved piston rod assembly which has a piston rod which is constructed so that either end thereof can be attached to either a piston or an extension of a pump crosshead.

A further object of this invention is to provide a piston rod formed with a tapered thread end portion for threaded engagement with a piston or pump crosshead, said rod also being formed with a threaded cylindrical portion inwardly of said end portion for receiving a lock nut to assist in maintaining the rod connected to the piston or the crosshead; said rod having said tapered thread end portion and said threaded cylindrical portion on either or both ends of said piston rod.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

Figure 1 is a view, partly in elevation and partly in section, illustrating two forms of the invention.

Figure 2 is an end view of the assembly shown in Figure 1 as viewed from the left end of Figure 1.

Figure 3 is a sectional view illustrating the rod connected to the piston by the same connection shown at the right-hand end of Figure 1, this being a modification of the invention.

In the drawings, a piston rod R is shown as connected with a pump piston P and a crosshead extension C. As will be explained in detail hereinafter, the piston rod R is so constructed, in its preferred form, that either end thereof can be connected to either the piston P or the crosshead extension C.

The pump piston P includes a piston body 10 which is substantially cylindrical on its outer surface 10a and which has an annular radial or lateral flange 10b formed thereon or connected thereto. Annular sealing members 11, which are formed of rubber or other resilient material in the known manner, are mounted on the piston body 10 with their inner surfaces 11a in contact with the flange 10b. The resilient members 11 are held in position on the body 10 by cup shaped retaining rings 12 which are removably attached to the piston body 10 by resilient lock rings 14 which fit into annular grooves 10c formed on the external surface of the body 10. The piston body 10 is formed with an internal longitudinal recess 16 which has a portion of its wall formed with internal tapered threads 16a. Such internal tapered threads 16a are adapted to be engaged with corresponding external tapered threads 17 formed at the one end of the piston rod R. As will be explained more fully hereinafter, the threads 16a and 17 are so constructed that the piston rod R is rotatable inwardly during the threading of the rod to the piston P until a very tight frictional engagement is effected between the piston rod R and the piston P. To this end, the threads 17 are ordinarily of greater length than the internal threads 16a so that the inward movement of the rod R with respect to the piston P is not stopped during the threading step until the threads 16a and 17 have been urged or jammed into a tight frictional engagement whereby the connection between the rod R and the piston P is very tight and difficult to release. The piston body 10 also is provided with an annular groove 10d which has therein an annular resilient seal ring 20 which is formed of rubber or any other similar resilient material which is adapted to seal with the external surface of the rod R outwardly from the threads 17 and 16a for thereby preventing the entrance of fluid into the longitudinal recess 16 and around the threads 16a and 17.

For rotating the piston body 10 relative to the rod R while threading the threads 17 of the piston rod R into threaded engagement the threads 16a in the body 10, the end of the body 10 opposite from said recess 16 is slotted with the longitudinal and transverse slots 10e for receiving a wrench or retaining tool (not shown).

The piston rod R may be formed with identical threads 17 at each end thereof so as to render the rod R reversible for the use of either end in the threaded portion 16a of the longitudinal recess 16 of the piston P. In Figure 1 of the drawings, the other end of the rod R is formed with threads 17' which are identical with, or substantially identical with, the threads 17 so that the rod R is reversible, but the right hand end (as viewed in Figure 1) of the piston rod R is modified to some extent as will be explained. As best seen in Figure 1, the external tapered threads 17' on the piston rod R are received within a longitudinal recess 25 of the crosshead extension C and such threads 17' are engaged with the threads 25a formed on the inner wall of the recess 25 to correspond with the threads 17'. Such threads 25a are internal tapered threads which are identical with, or substantially identical with, the threads 16a formed in the body of the piston P.

In the modification of the threaded end shown at the right hand end of the piston rod in Figure 1, a cylindrical threaded portion 26 is provided adjacent to the external tapered threads 17' for receiving a lock nut 27. For receiving a pipe wrench or other similar tool to effect the turning of the piston rod during the threading of the threads 17' and 25a, the rod R has a reduced diameter portion 30 which is preferably knurled or is otherwise roughened to facilitate the turning of the rod R.

Thus, if the rod R is formed as shown in Figure 1, it is initially turned with respect to the crosshead extension C by the use of a wrench or other similar tool in gripping engagement with the rod R at the reduced diameter portion 30. When the threads 17' and 25a are in friction tight engagement, the lock nut 27 is rotated on the cylindrical threaded portion 26 and moves into abutting engagement with the end 31 of the crosshead extension C to assist in maintaining the rod R connected to the crosshead extension C. Thereafter, the piston P is threaded onto the rod R by the use of a wrench in the slotted portion or slots 10e of the piston body 10 for effecting the rotation or turning of the body 10 relative to the piston rod R. Such relative rotation effects the threading of the threads 16a and 17 to a friction type engagement which prevents the release of such connection during use.

As previously explained, the piston rod R may be formed with the threads 17 at each end thereof, instead of employing the modified form shown at the right hand end of Figure 1 wherein the cylindrical threaded portion 26 is included. Similarly, if desired the left hand end of the piston rod R as shown in Figure 1 can be formed with the modified threaded construction illustrated at the right hand end of piston rod R in Figure 1. In such case, both ends of the piston rod would have a cylindrical threaded portion 26 and both ends would employ the lock nut 27. In such case the lock nut 27 would abut against the end 10f of the piston body 10 and of course the threads 26 would extend outwardly from the end 10f of the body 10 a sufficient distance to receive the lock nut 27. The seal ring 20 would ordinarily be eliminated when the threads 26 are employed on both ends of the rod R. Also, when the threads 26 are on both ends of the rod R, the reduced diameter portion 30 would usually be provided at each end of the rod R.

In any event the rod R of this invention may be formed so that either end thereof may be used in either the piston P or the crosshead extension C and therefore there is no danger of fouling or damaging the threads if the piston rod is inadvertently inserted in the wrong end, as is the case when different threads are used on each end of the rod R. Additionally, an improved connection is effected with the tapered threads as compared to prior connections between the piston and the crosshead extension primarily because the threads are permitted to effect a friction tight engagement and are not stopped in their threading action until such friction tight engagement is accomplished. It is believed evident that the use of the lock nut or nuts 27 is desirable with the piston rod R, but such lock nut or nuts 27 can be eliminated entirely if the rod R is formed with only the tapered threads 17 on each end thereof. It is believed evident that sealing means other than the seal ring 20 could be used and in some cases the groove 10d would be unnecessary.

The foregoing disclosure and description of the invention is illustrative and explanatory thereof, and various changes in the size, shape and materials, as well as in the details of the illustrated construction may be made, within the scope of the appended claims, without departing from the spirit of the invention.

What is claimed is:

1. In combination with a piston having a longitudinal recess with internal tapered threads and a crosshead extension having a longitudinal recess with substantially identical internal tapered threads, a piston rod having each end thereof formed with tapered external threads for the threaded engagement of either end of the piston rod with either the piston or the crosshead extension, whereby said piston rod is reversible.

2. The combination set forth in claim 1, wherein each end of said piston rod is formed with a cylindrical threaded portion which is located adjacent to and inwardly from the tapered threads at each end for receiving a lock nut on each cylindrical threaded portion.

3. A piston and rod assembly comprising, a piston having a longitudinal recess formed with tapered internal threads, and a piston rod adapted to be connected to said piston and having tapered external threads on one end thereof which engage with the tapered internal threads of the piston and establish a friction tight threaded connection between the piston and the piston rod, an annular flexible fluid-tight seal ring disposed outwardly of said internal and external threads and in said longitudinal recess of the piston in contact with the inner surface thereof and with the external surface of said piston rod for preventing fluid from passing into contact with said internal and external threads, whereby corrosion of said threads is minimized.

4. A piston and rod assembly comprising, a piston having a longitudinal recess formed with tapered internal threads, and a piston rod adapted to be connected to said piston and having tapered external threads on one end thereof which engage with the tapered internal threads of the piston and establish a friction tight threaded connection between the piston and the piston rod, said piston rod having a cylindrical threaded portion adjacent the tapered threads on said one end thereof which cylindrical threaded portion extends outwardly of said recess, and a lock nut threaded on said cylindrical threaded portion of said rod in abutting engagement with the end of said piston to thereby assist in maintaining the threaded connection between the piston and the piston rod.

5. A piston and rod assembly comprising, a piston having a longitudinal recess formed with tapered internal threads, and a piston rod adapted to be connected to said piston and having tapered external threads on one end thereof which engage with the tapered internal threads of the piston and establish a friction tight threaded connection between the piston and the piston rod, a cylindrical threaded portion adjacent the tapered threads on said one end thereof which cylindrical threaded portion extends outwardly of said recess, a lock nut threaded on said cylindrical threaded portion of said rod in abutting engagement with the end of said piston to thereby assist in maintaining the threaded connection between the piston rod, the other end of said piston rod being formed with a tapered external thread portion and a cylindrical external thread portion which are substantially identical with said thread portions on said first end of said rod, whereby said rod is reversible for the connection of either end thereof with said piston.

6. The combination set forth in claim 1, wherein one end of said piston rod is formed with a cylindrical threaded portion located adjacent to and inwardly from the tapered threads at said end, said cylindrical portion being disposed outside of the particular longitudinal recess in which said tapered threads are connected, and a lock nut adapted to be threaded onto said cylindrical threaded portion.

7. The combination set forth in claim 1, wherein that end of said piston rod which has its tapered threads connected in the recess of the piston is formed with a smooth cylindrical portion adjacent the inner end of said threads, said smooth cylindrical portion being located within the recess of the piston when the tapered threads of the rod are in full threaded connection with the threads of said recess, an annular flexible fluid-tight seal ring surrounding said cylindrical portion and sealing with the wall of the recess beyond the tapered threads, the opposite end of the piston rod which is connected into the recess of the crosshead extension being formed with a cylindrical threaded portion located adjacent to and inwardly from the tapered threads at that end of said rod, said cylindrical threaded portion being disposed outside of the recess in the crosshead extension when the threaded connection between said rod and said crosshead extension is fully made up, and a lock nut threaded on said threaded cylindrical portion and abutting the crosshead extension.

References Cited in the file of this patent

UNITED STATES PATENTS

| 1,568,269 | Cormier | Jan. 5, 1926 |
| 2,164,159 | Millmine | June 27, 1939 |
| 2,361,244 | Smith | Oct. 24, 1944 |
| 2,519,144 | MacClatchie | Aug. 15, 1950 |
| 2,741,518 | Leman | Apr. 10, 1956 |

FOREIGN PATENTS

| 847,236 | Germany | Aug. 21, 1952 |